United States Patent [19]
Böhm et al.

[11] 3,907,971
[45] Sept. 23, 1975

[54] METHOD OF REMOVING HF FROM GASES

[75] Inventors: Eberhard Böhm, Frankfurt am Main; Lothar Reh, Bergen-Enkheim; Ernst Weckesser; Gunter Wilde, both of Grevenbroich; Günter Winkhaus, Cologne, all of Germany

[73] Assignees: Metallgesellschaft Aktiengesellschaft, Frankfurt am Main; Vereinigte Aluminiumwerke Aktiengesellschaft, Bonn, both of Germany; part interest to each

[22] Filed: Nov. 15, 1971

[21] Appl. No.: 198,768

[30] Foreign Application Priority Data
Nov. 14, 1970 Germany............................ 2056096

[52] U.S. Cl. ................. 423/240; 423/465; 423/489
[51] Int. Cl. .............................................. B01d 53/34
[58] Field of Search ........... 423/215, 240, 241, 463, 423/464, 465, 495, 489; 55/71

[56] References Cited
UNITED STATES PATENTS

| | | |
|---|---|---|
| 2,526,776 | 10/1950 | Smith et al........................ 423/240 |
| 2,526,777 | 10/1950 | Smith et al........................ 423/240 |
| 2,996,354 | 8/1961 | Lacroix............................. 423/489 |
| 3,057,680 | 10/1962 | Schytil et al...................... 423/489 |
| 3,469,937 | 9/1969 | Roberts et al..................... 423/465 |

*Primary Examiner*—Earl C. Thomas
*Attorney, Agent, or Firm*—Karl F. Ross; Herbert Dubno

[57] ABSTRACT

Hydrogen fluoride is removed from a gas stream, e.g., the waste gas of an electrolysis cell for the production of aluminum, by using the gas as the fluidizing medium for an expanded fluid bed of particulate solids capable of taking up hydrogen fluoride. The solids content of the fluid bed chamber and the gas-flow parameters are adjusted to maintain a continuous solids concentration gradient throughout the entire vertically elongated chamber such that concentration decreases from the bottom to the top thereof. In addition, a major proportion of the solids removed from the chamber are withdrawn at the top of the bed in entrainment with gases, are separated from the effluent gas stream, and are returned to the chamber. The solids may be fed to the electrolysis bath.

2 Claims, 3 Drawing Figures

METHOD OF REMOVING HF FROM GASES

Field of the Invention

Our present invention relates to a process for recovering hydrogen fluoride from a gas stream containing same and, more particularly to the removal of hydrogen fluoride from waste gases of aluminum-electrolysis plants by so-called dry techniques. In general, the invention relates to the recovery of adsorbable, absorbable and reactive components in a gas stream with particulate solids to remove these components from the gas stream and/or incorporate them into the solids.

Background of the Invention

Numerous methods have been proposed for the interaction of a gas stream and a material reactive or otherwise having an affinity for a component of the gas stream. For example, it may be desirable to remove a particular component from a gas stream in order to recover the component as a valuable or useful substance and/or to eliminate the component from the gas stream so that the gas stream may be discharged into the atmosphere free from noxious or undesirable substances. Another utility for gas-solid heterophase interaction is the recovery of a substance containing a component of a gas stream for further use.

The heterophase reactions or interactions involving gases can be divided into the wet process and the dry process. In the wet process, the gas is contacted with a liquid medium by one or more of a number of techniques designed to bring about intimate contact between the gas phase and the liquid phase. When the interaction of a solid material with the gas component is desired in the wet method, the solid is dispersed or dissolved in the liquid phase. This method has been used for the washing of waste gases and, for example, in the case of waste gases containing hydrogen fluoride, the liquid phase may consist of an acidic or basic solution. The process, which may be described as scrubbing, takes place generally in scrubbing or washing equipment, e.g., venturi scrubbers which, because of the nature of the treating phase and the substance which is to be removed, is highly corrosive and subjects the apparatus to highly detrimental influences. Of course, droplets of the liquid phase can be passed in countercurrent or concurrent flow with the gas phase, the gas may be bubbled through liquid layers, the liquid may be trickled along a solid surface in a thin film while the gas sweeps thereover, etc. In all of these cases, the danger of corrosion is present and the disposal of the created sludge is expensive or in some cases impossible.

In the so-called "dry process," direct contact between a particulate solid and the gas is effected. For example, in the case of hydrogen fluoride, it has been proposed to feed a gas stream to be purified together with dry adsorbents or reactive solids, such as limestone, calcium carbonate, slaked lime, quick lime, alumina, activated alumina or magnesia into a conduit whose cross section is obstructed by a filter bag. The solids form a filter layer in the bag and are present in the gas stream in such quantity that the concentration of the solids is never less than that which is theoretically required to totally combine with the hydrogen fluoride.

We have used the term "adsorbent" above to refer to solid materials capable of interaction with the component of interest, hydrogen fluoride, in the gas stream. We intend this term to include those solids which truly function as adsorbents in the sense that the hydrogen fluoride is attached by surface-bond forces to the solid, as well as other methods of bonding including the formation of electrostatic and chemical bonds, a mechanical entrapment, chemisorption, etc. In some cases, the adsorbent will merely electrostatically or mechanically retain the hydrogen fluoride because of surface relationships and configurations. In other cases, an actual chemical reaction may occur to produce chemical bonding. In any case, the filter traps the solids carried by the gas stream in the conventional method described above while the gas, having reduced hydrogen fluoride concentration, traverses the filter. The filter cake acts as a porous adsorbent layer in which further quantities of hydrogen fluoride are extracted and every effort is made to maintain the particle distribution within the conduit as uniform as possible for effective filtration and gas/solid interaction. A critical disadvantage of this system is that the residence time of the solids in the gas stream, prior to entry into the filter layer, is brief and a complete utilization of the adsorbent particle cannot be attained. Periodic cleaning of the filter is also required for efficient throughputs.

It has also been suggested in the recovery of hydrogen fluoride from a gas stream such as the exhaust gases of electrolytic process, e.g., the production of aluminum by electrolysis, to pass the gas through a layer of alumina and thereby enrich the fluoride content of the alumina while reducing the hydrogen fluoride concentration of the gas. This system yields a solid product which can be charged into the electrolytic bath and even enables entrainment of the alumina by the gas into a filter. Here again, the disadvantages of the process originally described are obtained with the additional disadvantage that adsorption in a compact bed is inefficient and does not completely remove the contaminant.

Yet another system for recovering hydrogen fluoride from a gas stream is intended to purify gases containing less than 1 percent hydrogen fluoride by volume. The solid alumina particles, having a particle size from 3 to 12 mm, move countercurrent to the gas and the latter is purified to a residual concentration of hydrogen fluoride of 30 to 40 $mg/m^3$. The process has the disadvantage that only activated alumina can be used effectively and granules of the required particle size must be especially produced. Furthermore, the flow velocity of the gas is limited to 0.1 to 0.3 m/second so that large-flow cross sections are required for the high volume operations of commercial systems.

Yet another prior art system for removing hydrogen fluoride from a gas makes use of a dense fluidized bed of alumina capable of taking up hydrogen fluoride. The residence time of the gas in the fluidized bed, which has a height or thickness of 5 to 30 cm, is 0.25 to 1.5 seconds and is so limited that effective transfer hydrogen fluoride for maximum utilization of the adsorbent is possible. Furthermore, low gas velocities also characterize the system and large fluidized bed cross sections are therefore required. Any particle entrainment is limited by filter-type traps which must be frequently cleaned.

We also should mention that these processes rely upon a dense fluidized bed, i.e., a fluidized bed which mainains itself in a sharply defined layer. Above the top of the fluidized bed there is a sharp reduction in the concentration of solids and the major part of the fluidized bed chamber above the dense layer is free from particles except for the small proportion of fines which may be entrained with the gas stream. In other words, a dense fluidized bed generally consists of a bed whose solids concentration or density is several times greater within the bed than immediately thereabove, and a well defined boundary within the fluidized bed chamber between the low solids concentration space above the bed and the high solids concentration of the bed exists. The entire theory of dense-bed operation in connection with hydrogen fluoride extracting from the waste gases of an aluminum plant, derives in part from the fact that the density of the bed is utilized in part as a mechanical trap for particles which might otherwise tend to leave the bed in entrainment with the gases traversing the bed. In order to maintain the dense bed, therefore, the gas flow must be of a relatively low velocity. Therefore extended cross sections are required which create gas distribution problems.

The term "solids concentration" or "solids density" has been used therefore to describe the "dense" fluidized bed and we should note that these terms are used to refer to the ratio of solid particles per unit volume of the bed, either in terms of number of particles per unit volume or weight of particles per unit volume. A sharp demarcation between a dense fluidized bed and the region thereabove can be quantitatively detected by determining the solids density in terms of either number of particles or weight of particles per unit volume.

OBJECTS OF THE INVENTION

It is, therefore, the principal object of the present invention to provide an improved process for treating a gas stream containing a gaseous component with a solid having an affinity for this component.

Another object of the invention is to provide an improved economical, efficient and high-rate method of removing hydrogen fluoride from a gas stream containing same.

Another object of the invention resides in the provision of an improved method of purifying the waste gases of an aluminum plant.

Still another object of the invention is to provide an improved method of producing aluminum whereby the environmental dangers are reduced.

SUMMARY OF THE INVENTION

These objects and others which will become apparent hereinafter are attained, in accordance with the present invention, which is based upon our surprising discovery that the efficiency of removal of hydrogen fluoride from a gas stream containing same can be sharply increased to a qualitative improvement over prior-art systems when the contact between the gas phase and the solid phase is carried out in an expanded fluid bed, i.e., a fluid bed in which a substantially uniform or continuous gradient of solids concentration or density is maintained between the bottom of the fluid bed and the gas outlet therefrom, preferably throughout the height of the chambers, such that no sharp demarcation exists between a fluidized-bed layer and a free space above this bed, the gas flow being such that the major proportion of the solids removed from the expanded fluid bed is entrained by the gases, and separated therefrom. The separation may be effected by centrifugal and sedimentation processes and the separated solids recycled to the fluid bed.

Thus we have found surprisingly that good adsorption results can be obtained with high gas throughputs if the fluid-bed contact between the gas stream and the solid particles is controlled such that the gases which contain hydrogen fluoride are injected into the fluid-bed reactor as the fluidizing gas and at such velocity that the gas causes the solids to form an expanded fluid bed in which the solids concentration decreases upwardly over substantially the entire height of the fluid bed chamber and at least between the bottom of the fluid bed and the gas outlet, while the solids are mainly discharged from the chamber by the upwardly moving stream of gas.

When we refer to an "expanded" fluid bed, therefore, we mean one in which a more or less uniform gradient of solids concentration or solids density is maintained from the gas outlet at the top of the shaft to the bottom of the chamber at which the fluidizing gas is introduced. Bottom means a gas distributor device, e.g., a grate or a venturi type nozzle. The expanded bed, moreover, has no sharp boundary between free space and a layer of the solid material. Finally, in this connection, we speak of removal of the major portion of the solids upwardly by entrainment with the gases and also recirculation of the major proportion of the solids removed during any unit time of operation of the apparatus, to the fluid bed. This means that, while solids are continuously supplied to the bed and a corresponding quantity of solids removed, e.g., by mechanical means at a point intermediate the bottom of the bed and the gas outlet, a larger quantity of the solids is simultaneously entrained with the gas stream and is carried thereby from the fluid-bed reactor into a gas/solid separating apparatus from which the gases are discharged and the solids preferably recycled to the fluid-bed chamber. The recycling rate is mainly depending on the fluidizing gas velocity and the adjusted mean solids concentration. The recycling rate is between 5 and 100 the time by weight by quantity of solids forming the bed. Moreover, the feed of fresh solids to the fluid bed and withdrawal of a corresponding quantity of solids containing hydrogen fluoride, can be carried out intermittently while recirculation of solids is carried out continuously. During any operating period including replenishment and discharge of solids and recirculation, therefore, we have found it advantageous that the total quantity of recirculated solids should exceed the solids discharged from the fluid bed. If the total quantity by weight of recirculated solids over a period $t$ is represented by $Q$, the recirculation of velocity may be represented by $V = Q/t$. If the quantity of solids discharged during this period is represented by $q$, the average discharge rate $v=q/t$ and $Q/(Q+q)>0.5$). The sum $S=Q+q$ represents the total solids discharged from the bed within time $t$. We should mention that, where discharge of solids is not continuous, the instantaneous value $v$ of such discharge may exceed $V$ as long as the other conditions set forth above are maintained.

The solids which are employed according to the present invention may be any adsorbent capable of interaction with and having an affinity for the hydrogen fluoride to be removed. Preferably, the compound is an oxide which, upon adsorption of hydrogen fluoride can be incorporated in the electrolysis bath for the production of aluminum to promote the aluminum-making process. In a preferred embodiment of the invention, the solids are relatively fine-grained with an average particle size of 20 to 300 microns while a gas velocity within the shaft is 1 to 5 meters/second. The residence time of gas in the expanded fluid bed is thus about 1 to 15 seconds. The preferred particulate solids are fine-grained calcinated alumina and sodium aluminate which may be used individually or in mutaul admixture in any proportions. The temperature at which adsorption is carried out is preferably maintained at a temperature of 50° to 100°C.

With the aforedescribed parameters, alumina produced by the BAYER process and calcined in a fluidized bed was used to adsorb hydrogen fluoride from exhaust gases containing 20 to 50 mg of hydrogen fluoride/$m^3$ (standard temperature and pressure=STP) of gas discharged from an electrolysis plant in the production of aluminum. The gas was purified to a residual HF content of significantly less than 1 mg/$m^3$ (STP).

It has been found that the process is advantageous when the solid adsorbent does not need to be regenerated but passes through the fluid-bed reactor only once, i.e., is not returned to the reactor after discharge in the quantity $q$ mentioned earlier. This product can then be used directly in the electrolysis bath. The use of solids which remove hydrogen fluoride from the effluent gases of an aluminum production plant and then are introduced directly into the electrolytic cells thereof, has advantages, apart from yielding a low residual HF concentration in the effluent gases. Thus almost all of the hydrogen fluoride in the exhaust gas is recovered and recycles together with the oxide to the electrolysis bath, thereby reducing consumption of flux for electrolysis. Also the recovered hydrogen fluoride is uniformly distributed in the oxidic materials charged into the bath. The oxidic materials, are not excessively charged with hydrogen fluoride, so that the final hydrogen fluoride level in the effluent gases is reduced.

DESCRIPTION OF THE DRAWING

The above and other objects, features and advantages of the present invention will become more readily apparent from the following description, reference being made to the accompanying drawing, in which.

SPECIFIC DESCRIPTION

Figure 1:
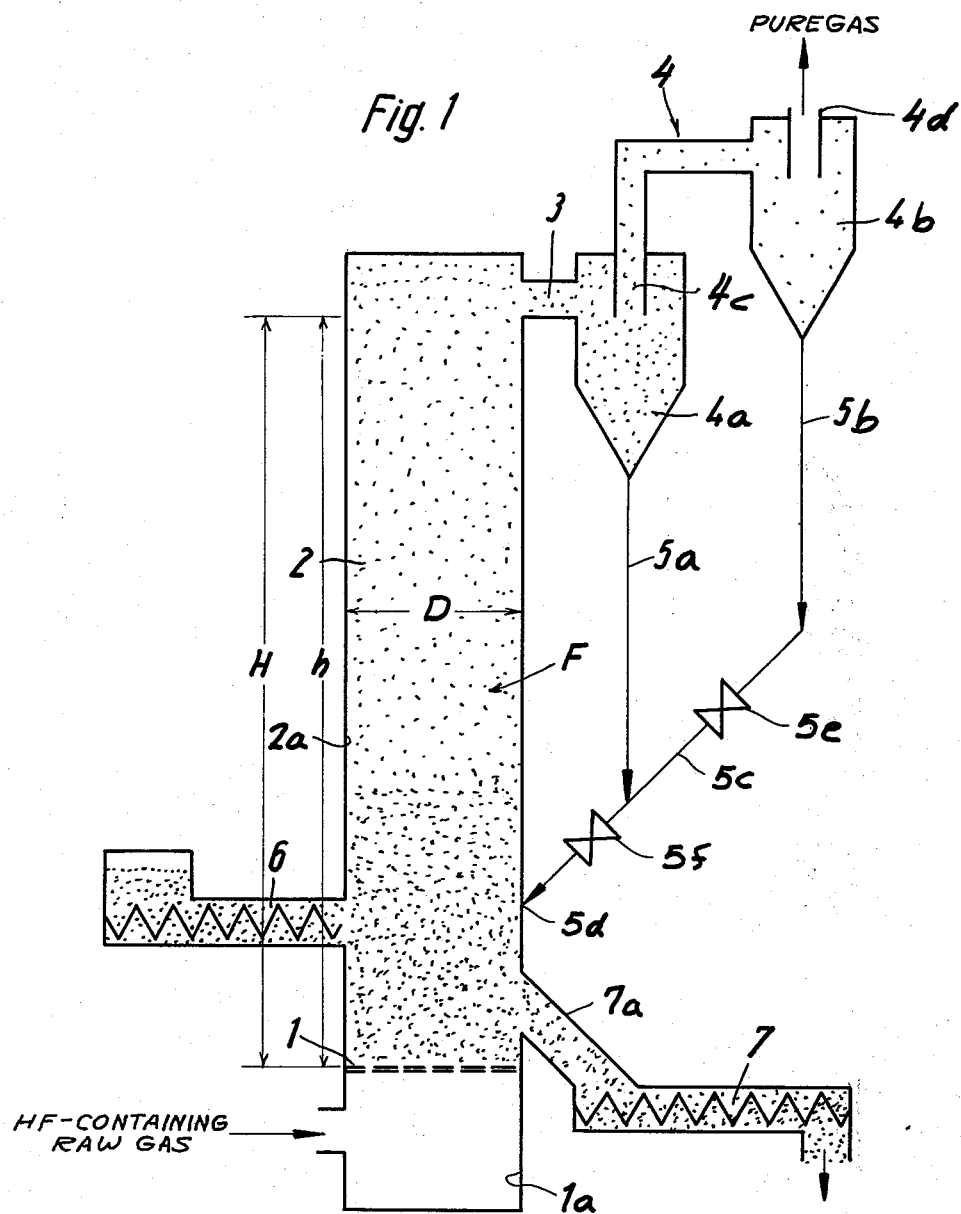
FIG. 1 is a vertical cross-sectional view, partly in diagrammatic form, of a reactor for recovering hydrogen fluoride from a gas stream.

In FIG. 1, we have shown an apparatus for recovering hydrogen fluoride from an HF-containing raw gas which is introduced into a vertical shaft 2, forming a fluid bed chamber 2a above a windbox 1a, separated by a perforated-plate gas distributor 1 from the fluidized bed chamber. The fluidized bed chamber 2 has a height (internal) H which greatly exceeds its major horizontal dimension D, in the case of a cylindrical shaft, its diameter, while the height $h$ between the distributor plate 1 and the gas outlet 3 at the upper end of the shaft is likewise greatly in excess of the dimension D. As is diagrammatically illustrated in FIG. 1, the fluid bed F within the chamber 2a extends over the full height of the chamber without any sharp demarcation between a space of reduced solids concentration and a space of high solids concentration. The solids concentration gradient is thus substantially uniform over the height of the chamber.

The outlet 3 communicates with a gas/solid separating apparatus generally represented at 4 and comprising a pair of dust-separating cyclones 4a and 4b whose dust bins are connected by lines 5a and 5b to a feed conduit 5c opening into the shaft 2 at 5d. Valves 5e and 5f enable the return of solids into the shaft. In accordance with conventional cyclone operating techniques, the outlet 3 of the shaft opens tangentially into the cyclone 4a whose riser 4c communicates with the cyclone 4b opening tangentially into the latter. Pure gas is discharged from the central riser 4d of the latter cyclone.

A screw-type conveyor 6 feeds fresh adsorbing solids to the shaft 2 at a location somewhat above the gas distributor 1 while an outlet 7a mechanically withdraws particulate solids from the fluid bed at a rate controlled by the discharge screw 7. The mean concentration of solids in the shaft of the reactor ranges preferably between 10 and 300 mg/$m^3$ of the volume of the chamber 2 and can established by synchronized control of the feed rate at 6 and the discharge rate at 7. The rate at which the adsorbent is recirculated per hour through the group of cyclones depending on the selected velocity of the fluidizing gas, may be 5 to 100 times the amount by weight of the adsorbent within the chamber 2. A small portion of the discharged adsorbent is not retained by the final cyclone 4b and can be removed in a high-efficiency dust collector downstream of the outlet 4d and is not illustrated in FIG. 1.

Figure 2:
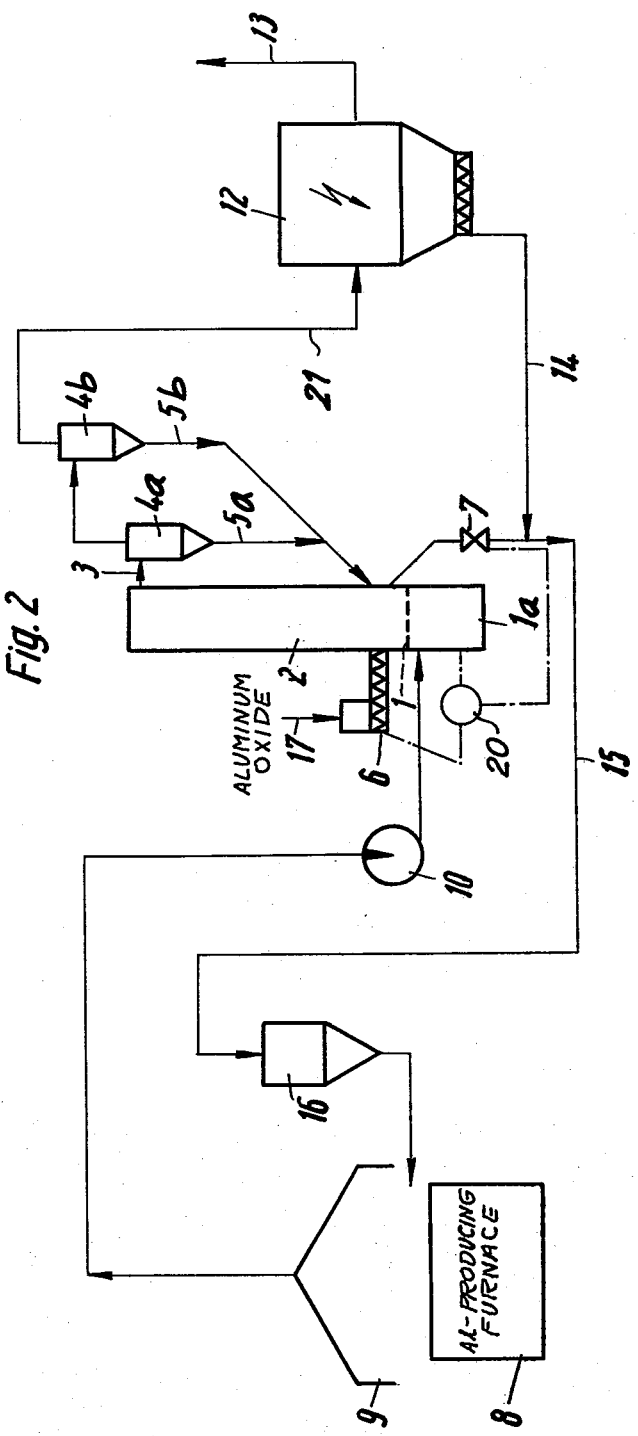
FIG. 2 is a flow diagram of a plant embodying the present invention.

In FIG. 2, we have shown a print for the production of aluminum which comprises a Hall-type electrolysis furnace 8 for the production of aluminum, above which is provided a hood 9 for collecting the exhaust gases. A blower 10 draws the exhaust gases from the hood 9 and forces them into the wind box 1a of the fluid bed shaft 2 which is constructed as illustrated in FIG. 1. The fluid bed, which consists of fine-grained alumina, absorbs hydrogen fluoride from the gas by a process or reaction which involves physical adsorption, chemisorption and chemical reaction. The discharged particles are separated from the gas stream by a cyclone 4a and 4b as previously described and recycled at 5a and 5b into the shaft 2. For example, 20 percent by weight of the alumina required for the electrolytic cell of the furnace is recovered at 7 and delivered to the furnace 8 via line 15 through a dispenser or hopper 16.

Fresh aluminum oxide is supplied by conduit 17 to the feeder 6 which continuously supplies the alumina to the expanded fluid bed. A pressure sensor 20 responds to the pressure in the wind box 1a and synchronously controls the feed device 6 and the discharge apparatus 7 to maintain the desired concentration of solids in the expanded layer substantially constant. The exhaust gases from the cyclones 4a, 4b are supplied at 21 to an electrostatic precipitator 12 in which entrained dust is removed, the dust being combined with the alumina supplied via line 15 to the furnace 8 by a conduit 14. The gases may then be discharged at 13 to the atmosphere.

Figure 3:
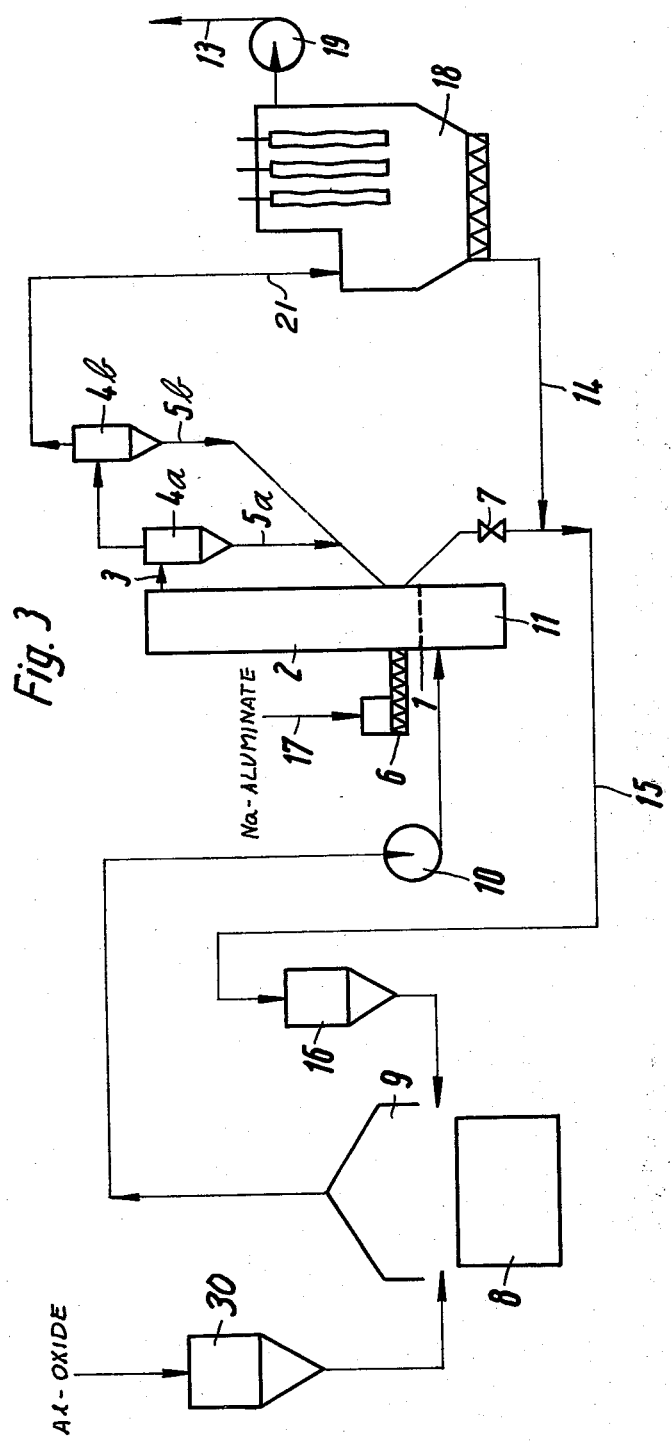
FIG. 3 is another flow diagram illustrating a further embodiment of the invention.

In FIG. 3, in which reference numerals identical to those of FIG. 1 or FIG. 2 identify identical structure, we show a modification of the system illustrated in FIG. 2 wherein the aluminum oxide delivered to the furnace 8 is supplied by a dispenser hopper 30 while sodium aluminate is fed at 17 to the feeder for use in the fluid bed. Since sodium aluminate can adsorb a larger quantity of hydrogen fluoride than alumina, it is sufficient to introduce smaller amounts of sodium aluminate at lower rates to the shaft 2.

In this embodiment, a bed-type filter 18 is used as the final dust collector and is followed by a blower 19. The sodium aluminate is then charged into the furnace via lines 14 and 15 through the dispenser hopper 16.

SPECIFIC EXAMPLES

Example I (with reference to FIG. 20.

A partial stream at a rate of 130 cubic meters per hour is branched from the hydrogen fluoride-containing gas which has been formed in the electrolytic furnace 8 and exhausted through the hood 9. Containing 35 milligrams hydrogen fluoride per cubic meter STP, the branch stream is blown at a temperature of 50° C. and under a pressure of 600 millimeters water through the gas distributor 1 into the circulating fluid bed shown in FIG. 1. By means of the feeder 6, fresh alumina having a mean particle size of 60 microns is fed into the circulating fluid bed at a rate of 500 grams per hour. The speed of the feeder is controlled to maintain a constant pressure drop across the bed.

The shaft 2 of the fluidized bed reactor has an inside diameter of 150 millimeters and an inside height of 3,000 millimeters. The shaft contains 5 kilograms $Al_2O_3$, which has an ignition loss of 1 percent and a specific surface (BET) of about 30 square meters per gram. The alumina has been produced by calcination in a fluidized bed. The gas to be purified enters at an empty-pipe velocity of 2 meters per second and maintains the alumina in suspension. The mean concentration of solids in that suspension is 95 kilograms per cubic meters. The rate at which the solids are circulated per hour is about 20 times the amount of solids in the pipe. After a mean residence time of 1.5 seconds in the shaft of the fluid bed reactor, the purified gas is discharged together with the hydrogen fluoride-laden alumina through the gas outlet 3 into the two cyclones 4a, 4b, in which the laden alumina is removed except for a residual dust content. The laden alumina is returned into the circulating fluid bed through downcomers 5a, 5b, which are provided with suitable means which ensure a satisfactory pressure seal.

The pure gas leaving the cyclones 4a, 4b, has a residual content of about 0.8 milligrams hydrogen fluoride per standard cubic meter and before being discharged into the open is passed through a succeeding electrostatic precipitator, in which the entrained fine dust is removed.

Example II (with reference to FIG. 3).

Exhaust gas which is at a temperature of 60° C. and contains 25–35 milligrams hydrogen fluoride per cubic meter STP, is blown at a rate of 5,000 cubic meters per hour through the gas distributor 1 into a circulating fluid bed according to FIG. 1. The pressure of the gas before the gas distributor is about 350 millimeters water. Fresh sodium aluminate is fed at a rate of 1.15 kilograms per hour through the feed conduit 17 and the metering device 6.

The shaft 2 of the fluidized bed reactor has an inside diameter of 900 millimetrs and an inside height of 4,500 millimeters. The shaft contains about 450 kilograms sodium aluminate having an $Na_2O/Al_2O_3$ mole ratio of about 1 and containing about 2 moles combined water per mole of aluminate. The average (50 percent by weight) particle size is 100 microns, the bulk density 0.3 kilogram per liter.

The gas to be purified flows in the shaft at an empty-pipe velocity of 2.6 meters per second. The mean residence time of the gases in the shaft is 1.75 seconds and the mean solids concentration is about 15–16 kilograms per cubic meter. The rate at which the solids are circulated per hour is about 10 times the amount of solids in the shaft.

Together with the purified gas, the laden sodium aluminate enters the two cyclones 4a, 4b, and is collected there except for a low residual content in the exhaust gas. The collected sodium aluminate is returned through downcomers 5a, 5b, into the fluidized bed reactor and this return recycling is controlled to maintain a constant pressure loss in the system. The pure gas leaving the cyclone contains gaseous hydrogen fluoride in an amount of 0.6–0.9 milligrams hydrogen fluoride per cubic meter (STP), and is passed through a succeeding bag filter 18 for dust collection and is then introduced by a blower 19 into the exhaust gas conduit 13. The sodium aluminate collected in the filter is passed through conduit 14 and together with the sodium aluminate which has been discharged through the discharge device 7 from the circulating fluid bed is fed through conveyor conduit 15 to the feed hopper 16 at the electrolytic furnace 8.

We claim:

1. A process for removing hydrogen fluoride from a gas stream by treating the gas stream with a solid having an affinity for the hydrogen fluoride, said method comprising the steps of:

fluidizing a column of particles having an average particle size of 20 to 300 microns of a solid selected from the group consisting of fine-grain alumina, sodium aluminate and mixtures thereof with a gas stream containing said hydrogen fluoride in an amount upwards of 20 mg/$m^3$ STP, said gas stream being introduced at a rate sufficient to provide a gas velocity within the column which is 1 to 5 meters/second to produce and maintain an expanded fluid bed with a continuous solids-concentration gradient extending over the entire length of the column from the gas inlet of the bed to the gas outlet thereof and substantially free from a demarcation between a layer of said solid and free space, the temperature of the gas introduced into said bed being adjusted to substantially 50° to 100°C;

withdrawing the fluidizing gas upon passage through said bed together with a main proportion of solids upwardly discharged therefrom in entrainment with the withdrawn gas;

separating the solid particles from said withdrawn gas by cyclone sedimentation and discharging a purified gas substantially free from HF; and recycling the separated particles to said fluid bed in an amount of 5 to 100 times the solids content of the fluidized bed.

2. The process defined in claim 1 wherein the average solids concentration ranges between 10 and 300 kg/$m^3$.

* * * * *